Sept. 7, 1937. E. A. NELSON Re. 20,500

CAST BRAKE DRUM CONSTRUCTION

Original Filed March 12, 1931 2 Sheets-Sheet 1

INVENTOR
Emil A. Nelson.
BY
Harness, Dickey, Pierce & Hann
ATTORNEYS.

Sept. 7, 1937. E. A. NELSON Re. 20,500

CAST BRAKE DRUM CONSTRUCTION

Original Filed March 12, 1931 2 Sheets-Sheet 2

INVENTOR
Emil A. Nelson.
BY
Harness, Dickey, Pierce & Hann
ATTORNEYS.

Reissued Sept. 7, 1937

Re. 20,500

UNITED STATES PATENT OFFICE 20,500

CAST BRAKE DRUM CONSTRUCTION

Emil A. Nelson, St. Clair Shores, Mich., assignor to Campbell, Wyant & Cannon Foundry Company, Muskegon Heights, Mich.

Original No. 1,975,968, dated October 9, 1934, Serial No. 522,021, March 12, 1931. Application for reissue October 5, 1936, Serial No. 104,125

27 Claims. (Cl. 188—218)

This invention relates to improvements in brake drums, and more especially to the type used in connection with the brake systems of automotive vehicles.

Objects of the invention are to provide a brake drum of a simple, durable and rigid construction, which will stand hard usage, occupy but little space, and which will be efficient in operation. Further objects are to provide a brake drum having a cast metal brake ring so as to secure the advantageous qualities of such metal; to provide a brake drum particularly resistant to distortion when the brake shoes are applied to the ring; to provide a brake drum having evenness of expansion and contraction under heat, and pressure, as when the brakes are severely and continuously applied; and to provide a brake drum having a friction surface of cast iron.

Other objects are to provide a brake drum structure wherein cast metal may be used in a brake ring and sheet or drawn metal of a higher tensile strength, shock resisting qualities, thinness of section, and the like, may be used in the supporting disc portion.

Further objects are to provide a mode of attachment of the disc to the cast ring in which the two members become substantially integral, wherein loosening and the resulting defects are obviated; and to provide a connection which is not affected by the severe thermal changes or heavy shocks.

Other objects and advantages will become apparent in the following description with reference to the accompanying drawings, in which, Fig. 1 is a partially broken and partially sectioned view of an automobile wheel with the brake mechanism mounted thereon, showing an illustrative embodiment of my invention.

Figure 1:
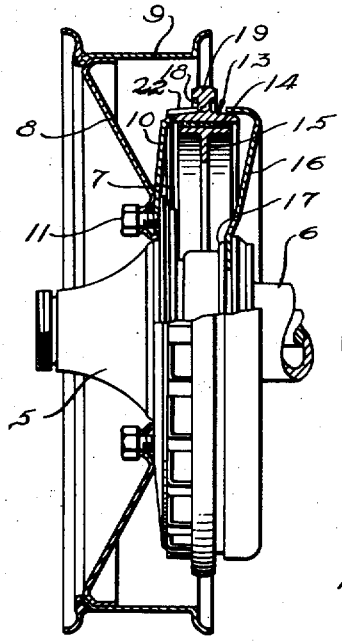
Figure 2:
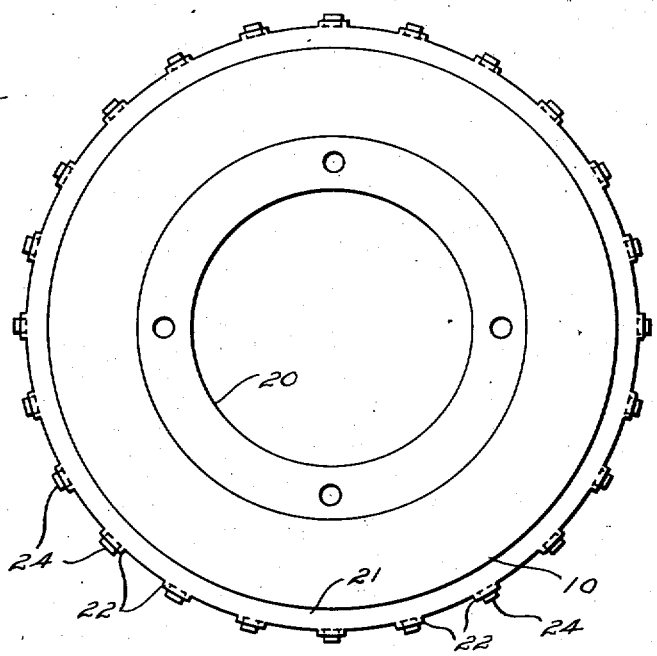
Fig. 2 is an end view of the supporting disc of the brake drum shown in Fig. 1, and drawn to a larger scale.
Figure 3:
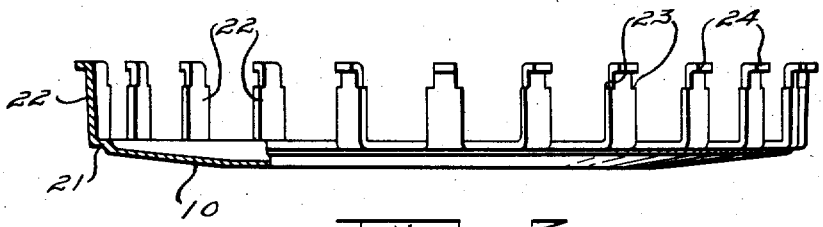
Fig. 3 is a side elevation of the part shown in Fig. 2 with portions broken away, and portions shown in section.

Referring to Fig. 1, a hub 5 is rotatably mounted on the axle housing 6, and the hub is provided with a flange 7 to which the disc 8 of the wheel 9, and the supporting disc 10 of the brake drum are secured by means of the bolts 11. To axially projecting fingers 22 formed on the disc 10 at its periphery, is secured the cast brake ring 13, in a manner which will next be described. The inner cylindrical surface 14 of the brake ring is engaged by the brake shoes 15 which may be mounted in any well known manner on the axle 6, and a circular sheet metal shield 16, for protecting the braking surfaces against foreign matter, is mounted on the flange 17 of the axle 6.

In the brake drum structure of this invention a cast brake ring 13 is provided having a T-shaped section comprising the cylindrical portion 14, the web portion 18, and the thickened outer rim portion 19.

The sheet metal disc 10, for supporting or attaching the brake ring to the support, consists of a disc having a central aperture 20, for the hub of the wheel, the disc portion being preferably slightly conical and offset inwardly around the circumference; and at the outer edge is provided a plurality of laterally or axially projecting fingers 22. The fingers 22 are reduced in width near the end to provide the shoulders or abutments 23, and the extreme ends are bent outwardly, forming the hooks or flanges 24 which provide abutments spaced from the first mentioned abutments. The disk 10 being of sheet metal, such disk has been produced by rolling, stamping or other working thereupon and is therefore a wrought metal having qualities of malleability, toughness and ductility, providing a support to which the brake ring is to be attached which is strong and tough with minimum weight.

Figure 4:
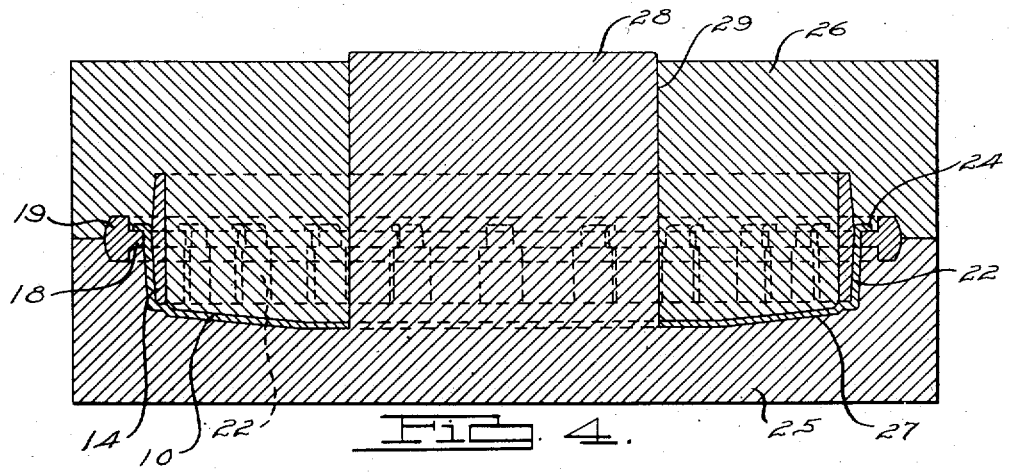
Fig. 4 is a cross section of one type of mold that may be used for casting the brake ring with the support disc in position.
Figure 5:
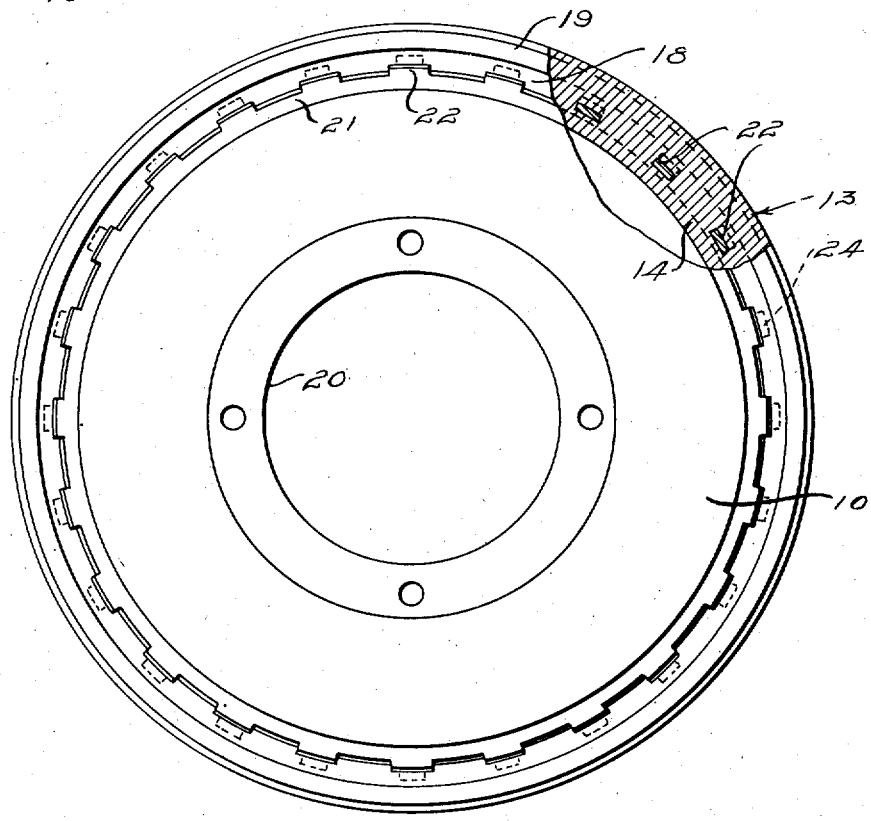
Fig. 5 is a view of the completed drum, looking from the outside, with portions broken away.

In constructing the brake drum, a mold consisting of a drag 25 and a cope 26 may be employed, the drag having a suitable cavity 27 for receiving the brake drum disc 10 in corresponding positional relation to the mold cavity for the brake ring. The drag 25 has a central cylindrical projection 28 which extends through the aperture 20 in the ring and also through a registering aperture 29 in the cope so that the parts are held in registration for pouring the metal of the ring. As will be seen in Fig. 4, the ends of the fingers extend across the mold space in which the web portion of the brake is formed, with the shoulders 23 at one side, and the hooks or flanges 24 at the opposite side. Then when the metal for the ring is poured into the mold the metal flows around the fingers, and, in cooling contracts against the included portions of the fingers and grips said portions very firmly, no actual union between the metals of the two parts being necessarily effected altho the two metals may become fused together in some cases. This provides a finished brake drum, as shown in Fig. 4, in which the sheet metal disc is connected by casting into the cast metal brake ring. The attachment is such that there is no danger of the parts becoming loosened or crystallization occurring from localized vibration. The spaced fingers provide a degree of resiliency transverse to the axis of the wheel so that the ring can align with the brake shoes, and the fingers serve to attach the disc to the middle of the ring so that the ring is not distorted into conical shape in expansion from the resistance of the disc, at one side. After the ring is cast the inside is finished with reference to the aperture 20 in the disc so that the cylindrical braking surface will be concentric with the axis of the wheel.

It is manifest that a simple, economic construction of brake drum is thus provided, wherein the cast brake ring and the sheet metal disc are combined to produce a drum having rigid and accurate braking surfaces which will remain in true cylindrical shape under very severe braking conditions, and in which the ring is supported with a degree of resiliency for centering and is not subjected to distortional resistance from the supporting disc in expanding.

While I have shown and described but one illustrative embodiment of my invention, alterations and omissions may be had without departing from the spirit of the invention as defined in the following claims.

I claim:

1. A brake drum comprising a cast metal brake ring, and a pressed metal disc for supporting the ring or attaching the ring to a support, the disc having axially projecting supporting portions the free ends of which are irregular in shape and are cast into the metal of the ring.

2. A brake drum comprising a cast metal brake ring and a supporting disc therefor having laterally projecting fingers provided with irregularly shaped free ends cast into the metal of the ring for connecting the disc thereto.

3. A brake drum comprising a cast metal brake ring, and a supporting disc having laterally projecting fingers cast into the metal in the periphery of the ring only between the sides thereof.

4. A brake drum comprising an open ended cast metal brake ring and a sheet metal supporting disc having a plurality of axially projecting fingers at its periphery, the outer ends of said fingers being marginally shaped to provide an abutment and being imbedded in said ring.

5. A brake drum comprising a cast metal ring having a radially outwardly extending flange formed on the periphery thereof, and a sheet metal support disc having laterally projecting fingers cast into the flange.

6. A brake drum comprising a cast brake ring having an inverted T-section comprising the brake cylinder or ring section and an outwardly projecting web portion, and a supporting disc having a laterally projecting finger extending through and cast into the web so that the portions of the finger included in the web are gripped by the metal in cooling.

7. A brake drum comprising a cast metal brake ring having a radial flange around the periphery midway between the sides of the ring, and a support disc having laterally projecting fingers cast into the flange and surrounded by the metal thereof.

8. A brake drum comprising a disc having a plurality of fingers projecting axially from its periphery, axially spaced abutments adjacent the free ends of said fingers, and a ring having apertures through which said fingers project, opposite sides of said ring engaging said abutment.

9. A brake drum comprising a disc having a plurality of fingers projecting axially from the periphery thereof, and brake ring having apertures therein, said fingers projecting through said apertures and being secured to said ring.

10. A brake drum comprising a disc having a plurality of fingers projecting axially from its periphery, a brake ring having a radially outwardly projecting flange between its edges, said flange having apertures therein, and said fingers being engaged in said apertures.

11. A brake drum comprising a disc having a plurality of axially projecting integral fingers arranged around its periphery, the free ends of said fingers being reduced to form abutments and the end portions of said reduced ends being laterally bent to form additional abutments spaced from the first mentioned abutments, and a ring having a radial flange between its edges, said flange having apertures therethrough receiving that portion of said fingers between said abutments.

12. A brake drum comprising a supporting disc portion and a brake ring portion, axially projecting finger members arranged around the periphery of said disc portion and provided with abutments adjacent to but spaced from their free ends, said ring portion having a radial flange thereon, said flange having apertures therein, said fingers projecting through said apertures and the ends thereof being deformed to hold said flange against said abutments.

13. A brake drum comprising a supporting disc portion and a brake ring portion, axially projecting finger members arranged around the periphery of said disc portion and provided with abutments adjacent to but spaced from their free ends, said ring portion having a radial flange thereon, said flange having apertures therein, said fingers projecting through said apertures, and the ends thereof being bent over against said flange so as to hold the opposite side of said flange against said abutments.

14. A brake drum comprising a sheet metal supporting disc having axially directed marginal portions of varying widths, and a cast metal brake ring cast onto said portions and mechanically interlocked therewith.

15. A brake drum comprising an open ended cast metal ring, a sheet metal supporting disc, and axially directed portions at the periphery of said disc imbedded in said ring and marginally formed to provide abutments for mechanically locating said ring against movement relative thereto in at least one direction.

16. A brake drum comprising an open ended cast metal ring, a sheet metal supporting disc, and axially directed projections on said disc being completely surrounded by the metal of said ring for at least a portion of their length and fused thereto.

17. A brake drum comprising an open ended cast metal ring, a sheet metal supporting disc closing one end of said ring, and axially directed projections on said disc embedded in said ring and completely surrounded by the metal thereof for at least a portion of their length.

18. A brake drum comprising an open ended ring of cast material, a sheet metal supporting disc abutting one end of said ring, and axially directed projections integral with said disc adjacent the periphery thereof projecting into the metal of said ring and locked thereto.

19. In combination, an annular integral cast metal self-contained brake drum ring, a wrought metal support therefor extending across one open end thereof and having about its periphery projecting members substantially parallel with the axis of the ring which penetrate and are embedded in the body of the cast drum ring in permanent interlocking relationship therewith.

20. A brake drum comprising an annular metal brake drum ring, a wrought metal backing plate having peripheral interlocking and fused members embedded in cast relation with respect to said drum ring, the members serving solely as connecting means between the wrought backing plate and the cast drum.

21. In combination, a cast metal brake drum ring, a wrought metal backing plate at one end of the ring and connecting means projecting from the backing plate substantially parallel with the axis of the ring and permanently embedded in and interlocking with the body of cast metal.

22. A brake drum comprising a cast metal brake drum ring, a wrought metal supporting plate therefor, interlocking means at the peripheral portions of the supporting plate permanently embedded in the cast metal of the drum ring between the inner and outer peripheral surfaces of the ring.

23. In combination, a brake drum ring made entirely of cast metal, a wrought metal supporting member therefor, peripheral portions of the wrought metal supporting member being permanently embedded in the cast metal of the ring and extending in substantially parallel relation to the axis of the ring, parts of said peripheral portions being of different dimensions within the metal of the ring than where they project from the ring.

24. In combination, a brake drum ring, the outer and inner peripheries of which are entirely made of cast metal, a wrought metal supporting member, peripheral portions of which are permanently embedded in the cast metal of the ring between the outer and inner peripheries thereof and having a fused connection with the cast metal.

25. In combination, a cast metal brake drum ring, a metal support therefor, the brake drum being cast onto and enclosing the peripheral portions of the support and having a fused connection thereto.

26. In combination, a cast brake drum ring and a back supporting member therefor, a portion of such member adjacent its edges being embedded in the cast brake drum ring and fused therewith.

27. A brake drum comprising, a cast metal brake drum ring and a sheet metal back supporting member therefor, said supporting member having inturned edge portions substantially paralleling the axis of the ring and fused and interlocked with said ring.

EMIL A. NELSON.